United States Patent

Shibasaki et al.

[11] Patent Number: 5,968,248
[45] Date of Patent: Oct. 19, 1999

[54] HEAT-RESISTANT INORGANIC PIGMENT AND PROCESS FOR PRODUCING THE SAME

[75] Inventors: Yasuo Shibasaki; Kiichi Oda; Saburo Sano, all of Nagoya; Shigehisa Yamamoto; Nanao Horiishi, both of Hiroshima, all of Japan

[73] Assignees: General of Agency of Industrial Science, Tokyo; Toda Kogyo Corporation, Hiroshima, both of Japan

[21] Appl. No.: 08/799,998

[22] Filed: Feb. 13, 1997

[30] Foreign Application Priority Data

Feb. 15, 1996 [JP] Japan ........................ 8-054139

[51] Int. Cl.⁶ ............................................. C09C 1/36
[52] U.S. Cl. ........................ 106/439; 106/440; 106/449
[58] Field of Search ....................... 106/439, 440, 106/449

[56] References Cited

U.S. PATENT DOCUMENTS

| | | | |
|---|---|---|---|
| 2,206,278 | 7/1940 | Dreyfus | 106/440 |
| 2,213,168 | 8/1940 | Monk et al. | 106/440 |
| 3,956,007 | 5/1976 | Modly | 106/440 |
| 4,075,029 | 2/1978 | Nuss | 106/449 |
| 4,574,012 | 3/1986 | Oguri et al. | |

FOREIGN PATENT DOCUMENTS

| | | |
|---|---|---|
| 27 14 654 | 10/1978 | Germany . |
| 41 21 352 A1 | 1/1993 | Germany . |
| 43 40 266 A1 | 6/1994 | Germany . |
| 43 14 267 A1 | 11/1994 | Germany . |
| 408208274 | 8/1996 | Japan . |
| 1 512 975 | 6/1978 | United Kingdom . |

OTHER PUBLICATIONS

Chemical Abstracts Ref 120540k, vol. 122, 1995 (no month).
Chemcial Abstracts 61107w, vol. 117, 1992 (no month).
Chemical Abstracts Ref. 56942k, vol. 117, 1992 (no month).
Chemical Abstracts Ref. 62898a, vol. 115, 1991 (no month).
Chemcial Abstracts Ref. 155717k, vol. 114, 1991 (no month).
Farbe & Lack Aug. 1996, Hackman, J. R.: Complexe anorganische Pigmente.
CA 119:31055, Nishihara et al., "Manufacture of titanium oxide–based yellow pigments having high brightness and coloring ability", corresponds to JP 05043235 A2, Feb. 1993.
Derwent Abstract 80–63275C/36 & JP550098261A Pola Kasei Kogyo, Jul. 1980.

*Primary Examiner*—Michael Marcheschi
*Attorney, Agent, or Firm*—Nixon & Vanderhye P.C.

[57] ABSTRACT

A heat-resistant inorganic pigment of the present invention comprises a composite metal oxide containing Ti and two divalent metals selected from the group consisting of Mg, Fe, Ni and Co, the content of said two divalent metals in said composite metal oxide being 0.95 to 1.05, in an atomic ratio, based on Ti, and the composition ratio of said two divalent metals being 95/5 to 5/95 in an atomic ratio. The pigment of the present invention is useful as a pigment for a heat-resistant coating material and is a novel heat-resistant inorganic pigment which does not pollute the environment.

5 Claims, No Drawings

HEAT-RESISTANT INORGANIC PIGMENT AND PROCESS FOR PRODUCING THE SAME

BACKGROUND OF THE INVENTION

The present invention relates to a heat-resistant inorganic pigment and a process for producing the same, and more particularly, it relates to a heat-resistant inorganic pigment assuming various hues and a process for producing the same. The pigment of the present invention is useful as a pigment for a heat-resistant coating material and is a novel heat-resistant inorganic pigment which does not pollute the environment.

As a representative of composite metal oxides containing one divalent metal M and Ti, ilmenite (titanic iron) will be cited in which the divalent metal M is Fe. Composite metal oxides which contain one selected from the group consisting of Mn, Mg, Ni and Co as the divalent metal M and Ti are also reported in *J. Phys. Soc. Jpn.* Vol. 11, No. 5, published in May, 1956 and ibiden Vol. 13, No. 10, published in October 1958 as a composite metal oxide which contains other than Fe as the divalent metal M.

Any of these composite metal oxides such as ilmenite, etc., which contain one divalent metal M and Ti is obtained by heating and calcining at a temperature of not lower than 1350° C., as described in the above literature.

Japanese Patent Application Laid-Open (KOKAI) Nos. 1-298028 (1989), 4-325419 (1992) and 4-55324 (1992) disclose methods of synthesizing $FeTiO_3$ particles, $MnTiO_3$ particles and $CoTiO_3$ particles, respectively, in an autoclave.

The ilmenite particles disclosed in Japanese Patent Application Laid-Open (KOKAI) No. 1-298028 (1989) are individual $FeTiO_3$ particles which have an average particle diameter of 0.05 to 2.0 μm and which have a uniform particle size; the pigment particles disclosed in Japanese Patent Application Laid-Open (KOKAI) No. 4-325419 (1992) are individual $MnTiO_3$ particles which have an average particle diameter of 0.5 to 2.0 μm and which have a uniform particle size; and the pigment particles disclosed in Japanese Patent Application Laid-Open (KOKAI) No. 4-55324 (1992) are individual $CoTiO_3$ particles which have an average particle diameter of 0.5 to 2.0 μm and which have a uniform particle size.

It is widely known that each composite metal oxide $MTiO_3$ (M represents a divalent metal) represented by ilmenite, $MnTiO_3$ or $COTiO_3$ has a good heat resistance, but each has a monotonous hue and lacks in variety. For example, the hues of the composite metal oxides of $FeTiO_3$, $MnTiO_3$ or $CoTiO_3$ particles obtained by the methods of synthesis described in Japanese Patent Application Laid-Open (KOKAI) Nos. 1-298028 (1989), 4-325419 (1992) and 4-55324 (1992), are black, yellow and green.

Although it is described in the afore-mentioned Japanese KOKAIs that the heat resistance of each composite metal oxide is not lower than 150° C., since it is obtained by synthesizing at a temperature of not higher than 300° C. as described therein, the upper limit of the heat resistance is about 300° C. (refer to Comparative Example described later). These composite metal oxides are, therefore, used in the field of general coating materials and toners, and use thereof in the field which requires a heat resistance exceeding 300° C. is not disclosed nor taught.

Accordingly, a technical problem of the present invention is to provide at the production of a novel heat-resistant inorganic pigment which assumes various sharpness hues and is rich in variety, which is usable in the field requiring a heat resistance of not lower than 300° C., and which does not pollute the environment.

As a result of earnest studies undertaken by the present inventor to solve the afore-mentioned problem, it has been found that by mixing compounds of two divalent metals selected from the group consisting of Mg, Fe, Ni and Co with $TiO_2$, heating and calcining the obtained mixture at a temperature of not more than 1350° C., and pulverizing the calcined material, the obtained particles containing a specified ratio of two divalent metals selected from the group consisting of Mg, Fe, Ni and Co, and Ti, assume various sharpness hues and are usable as a pigment in the field which requires a heat resistance of not lower than 300° C. On the basis of this finding, the present invention has been achieved.

SUMMARY OF THE INVENTION

It is an object of the present invention to provide an inorganic pigment which have an excellent heat resistance, which assumes various sharpness hues and which does not pollute the environment.

It is another object of the present invention to provide a process for industrially mass-producing a heat-resistant inorganic pigment which assumes various sharpness hues and which does not pollute the environment.

To accomplish the aims, in a first aspect of the present invention, there is provided a heat-resistant inorganic pigment comprising a composite metal oxide containing Ti and two divalent metals (M1 and M2) selected from the group consisting of Mg, Fe, Ni and Co, the content of the two divalent metals in the composite metal oxide being 0.95 to 1.05, in an atomic ratio, based on Ti and the composition ratio (M1/M2) of the two divalent metals is 95/5 to 5/95 in an atomic ratio.

In a second aspect of the present invention, there is provided a process for producing a heat-resistant inorganic pigment as defined in the first aspect, which comprises the steps of: mixing compounds of two divalent metals selected from the group consisting of Mg, Fe, Ni and Co with $TiO_2$; heating and calcining the obtained mixture at a temperature of not more than 1350° C.; and pulverizing the calcined product.

DETAILED DESCRIPTION OF THE INVENTION

The heat-resistant inorganic pigment according to the present invention will first be described.

The heat-resistant inorganic pigment according to the present invention contains Ti and two divalent metals, and assumes various different sharpness hues while maintaining an excellent heat resistance by varying the kinds and the composition ratio of the two divalent metals.

The two divalent metals (M1 and M2) are reacted with Ti at the atomic ratio of 1 based on Ti to produce the composite metal oxide, but the metal content in the present invention is so determined that the sum of the two divalent metals (M1 and M2) is as an allowable range 0.95 to 1.05, in an atomic ratio, based on Ti. In case where the sum of the two divalent metals (M1 and M2) is not less than 0.95 and less than 1, in an atomic ratio, based on Ti, an unreacted $TiO_2$ of more than zero and not more than 0.05, in an atomic ratio, based on the two divalent metals (M1 and M2) is present with the produced composite metal oxide. Also, in case where the sum of the two divalent metals (M1 and M2) is more than 1 and not more than 1.05, in an atomic ratio, based on Ti, an unreacted two divalent metals (M1 and M2) of more than zero and not more than 0.05, in an atomic ratio, based on Ti is present with the produced composite metal oxide. The amount of each of the unreacted two divalent metals (M1 and M2) or unreacted $TiO_2$ is preferably not more than 0.03, more preferably not more than 0.02 in an atomic ratio. If the sum of the two divalent metals (M1 and M2) is less than 0.95, in an atomic ratio, based on Ti and exceeds 1.05, in an atomic ratio, based on Ti, it is difficult to obtain a pigment assuming a sharpness hue.

There is a difference in hue between a pigment containing Ti and one divalent metal and a pigment containing Ti and two divalent metals (M1+M2). The atomic ratio of two divalent metals (M1/M2) is 95/5 to 5/95, preferably 85/15 to 15/85, more preferably 80/20 to 20/80. In the pigment containing Ti and two divalent metals (M1+M2), when M1/M2 atomic ratio is 95/5 to 5/95, a change in hue is large, while when the said atomic ratio out of this range, the hue approximates that of a pigment having only one divalent metal (M1 or M2) and a change in hue is small.

For example, although a composite metal oxide containing Ti and only one divalent metal: Mg assumes white, when a composite metal oxide has a composite divalent metal composition comprising Mg and another divalent metal, the hue thereof changes. If Fe is contained as a divalent metal other than Mg, the composite metal oxide assumes a brown hue. If Ni is contained as a divalent metal other than Mg, the composite metal oxide assumes a yellow hue. If Co is contained as a divalent metal other than Mg, the composite metal oxide assumes a blue hue.

In addition, for example, although a composite metal oxide containing Ti and only one divalent metal: Ni assumes yellow, when a composite metal oxide has a composite divalent metal composition comprising Ni and another divalent metal, the hue thereof changes. If Co is contained as a divalent metal other than Ni, the composite metal oxide assumes a green hue. If Fe is contained as a divalent metal other than Ni, the composite metal oxide assumes a brown hue.

Furthermore, for example, although a composite metal oxide containing Ti and only one divalent metal: Co assumes dark green, when a composite metal oxide has a composite divalent metal composition comprising Co and another divalent metal, the hue thereof changes. If Fe is contained as a divalent metal other than Co, the composite metal oxide assumes a dark brown hue.

The present inventor presumes that the above phenomenon of a change in hue is presented for the following reason. $MTiO_3$ (M denotes a divalent metal) represented by ilmenite is colored by transition between molecular orbitals, and the hue is determined by the type of the divalent metal. If a composite metal oxide has a composition represented by (M1+M2)/Ti=1, and the composite metal oxide has a composite divalent metal composition comprising two divalent metals (M1+M2), a change is caused in the charge-transfer due to the two divalent metals, and the degree of change thereof is dependent upon the kind of two divalent metals (M1, M2), the composition ratio (M1/M2), etc. The hue changes in correspondence with the change of the charge-transfer.

The process for producing a heat-resistant inorganic pigment according to the present invention will now be described.

As each compound of the divalent metal materials: Mg, Fe, Ni and Co, an oxide of each metal or each metal compound which becomes a metal oxide by heating is used, and $TiO_2$ particles are used as a Ti material. It is preferable that each material has a particle diameter of about 0.05 μm to about 1.0 μm, more preferably about 0.1 μm to about 0.5 μm.

After all the materials are mixed with each other, the resultant mixture is heated and calcined at a temperature of not more than 1350° C., preferably 1000 to 1350° C., more preferably 1150 to 1300° C. The calcining temperature of not more than 1350° C. is sufficient and as a result, the pulverization is facilitated. The method of pulverization is not specified, and an ordinary method is adopted. If the heating and calcining temperature is lower than 1000° C., it may be difficult to obtain the particles of a composite metal oxide which have an excellent heat resistance. Although the target particles are obtained even if the calcining temperature exceeds 1350° C., the calcined product obtained is so hard that pulverization is difficult and uniform fine particles are difficult to obtain. Also, it is preferred that the lower limit of the calcining time is 100 minutes and the upper limit of the calcining time is 300 minutes. In the consideration of industrial and economical efficiencies, the more preferable calcining time is 100 to 200 minutes.

It is considered to be because the composite composition of two divalent metals causes a eutectic reaction that the calcining temperature falls to not more than 1350° C.

The inorganic pigment of the present invention is composed of a composite metal oxide containing titanium and two divalent metals, which has a heat resistance of not lower than 350° C., preferably not lower than 450° C., more preferably not lower than 600° C., and an average particle diameter of about 0.05 μm to about 2.0 μm, preferably about 0.1 μm to about 1.0 μm, more preferably about 0.1 μm to about 0.6 μm.

As is well known, a heat-resistant coating material is generally one which displays a function as a coating film even in a temperature range of not lower than 200° C. Polyimideamide resin coating materials, silicon resin coating materials and fluorine resin coating materials are coating materials having a special function which are so excellent in heat resistance as to be resistant in a temperature range of 300 to 650° C. The heat-resistant inorganic pigment of the present invention is suitable as a color pigment for these heat-resistant coating materials.

For example, the yellow color in a road sign represents 'regulation' or 'warning' and is therefore very important. However, since the color pigment used for a yellow coating film of a road sign is chiefly chrome yellow, the influence of the yellow coating film on the environment such as dust of the abraded coating film and the elusion of the yellow pigment due to rain water is in serious problem. The 'road sign yellow' represented by the number 'P31-2611' in the color sample book published by the Nihon Toryo Kogyo Kai is "5.5YR6.5/12" by the Munsell color standard in Japan. The hue of the pigment obtained in Example 2 which will be described later is "5YR6/12" by the Munsell color standard in Japan. These hues closely resemble each other, and the pigment of the present invention has a sufficient heat resistance to the heating and melting temperature at the time of film coating. Consequently, if the pigment is used for a coating film of a road sign as a color pigment, the above-described problems is solved.

In addition, since the heat-resistant inorganic pigment of the present invention is a harmless inorganic calcined product, it does not cause an environmental pollution resulting from a color pigment containing lead, chrome or cadmium. The present invention can therefore be said to have a great industrial utility.

EXAMPLES

The present invention will now be explained with reference to examples and comparative examples. However, it is to be understood that the present invention is not restricted to these examples.

The average particles diameter in each of the following examples and comparative examples was expressed by the average value of 250 particles measured in electron microphotographs.

The composition of the particles measured by using "Fluorescent X-ray analyzer Model 3063M" (manufactured by Rigaku Denki Kogyo Co., Ltd.).

The crystalline structure of the particles was measured by using "X-ray diffractometer RAD-IIA" (manufactured by Rigaku Denki Kogyo Co., Ltd.).

The hues were evaluated on the basis of the Munsell color standard in *Color Sample Book for Coating Materials*, ed. S 1993, published by the Nihon Toryo Kogyo Co., Ltd.

The heat resistance was expressed by the temperature at which a change in hue was observed between before and after reheating when a sample was reheated at each constant temperature of 300° C. for 60 minutes, 400° C. for 60 minutes, 500° C. for 60 minutes, 600° C. for 60 minutes, 700° C. for 60 minutes and 800° C. for 60 minutes,.

Example 1

(Preparation of Heat-resistant Pigment)

100 g of MgO particles having an average particle diameter of 0.10 $\mu$m, 200 g of $Fe_2O_3$ particles having an average particle diameter of 0.25 $\mu$m and 400 g of $TiO_2$ particles having an average particle diameter of 0.25 $\mu$m were charged into an automatic attrition mill and pulverized and mixed with each other for 60 minutes. The resultant mixture was heated and calcined in an aluminum crucible at 1100° C. for 150 minutes by using an electric furnace. The calcined material was then taken out of the crucible and was further pulverized by the attrition mill for 60 minutes to obtain 700 g of a pigment having an average particle diameter of 0.23 $\mu$m. The particles obtained were applied to X-ray structural analysis and fluorescent X-ray composition analysis. The hue was measured on the basis of the Munsell color standard.

As a result, it was proved that the pigment was composed of 70 mol % of ARMALCOLITE and 30 mol % of RUTILE, that the composition was (Mg+Fe)/Ti=1, wherein Mg/Fe was 50/50, and that the hue resembled the color of dried grass and it was 2. 5Y8/14 by the Munsell color standard.

When the pigment obtained was reheated at each temperature between 300 to 800° C., almost no change of the hue was observed until the temperature was raised to 700° C. Thus, the heat resistance of the pigment was judged to be 700° C.

(Preparation of Heat-resistant Coating Material)

10 g of the pigment obtained was charged into a 140-ml glass vessel together with polyimideamide resin varnish and xylene in the following ratio and 90 g of glass beads having a diameter of 3 mm, and they were mixed and dispersed with a paint shaker (manufactured by Toyo Seiki Co., Ltd.), to prepare a mill base.

| | |
|---|---|
| Pigment obtained | 6 parts by weight |
| Polyimideamide resin varnish (produced by Mitsubishi Chemical Corporation) | 54 parts by weight |
| Xylene (produced by Yoneyama Yakuhin Kogyo Co., Ltd.) | 8 parts by weight |

Cyclohexanone and bentonite in the following ratio were added to the obtained mill base, and they were further mixed and dispersed with the paint shaker for 30 minutes to prepare a heat-resistant coating material.

| | |
|---|---|
| Mill base obtained | 68 parts by weight |
| Cyclohexanone (first class grade chemical, produced by Wako Pure Chemical Industries, Ltd.) | 30 parts by weight |
| Bentonite (produced by Wako Pure Chemical Industries, Ltd.) | 2 parts by weight |

The heat-resistant coating material was sprayed onto an iron plate, and the coated iron plate was baked and dried at 250° C. for 30 minutes. After the coating film was heated at 350° C. for 60 minutes, no color change was visually observed.

Examples 2 to 12, Reference Examples 1 to 4

Pigments were produced in the same way as defined in Example 1 except for varying the kinds of the divalent metals (M1 and M2), the amounts thereof, and the temperature and the time for calcining. The conditions for production are shown in Table 1 (Conditions for Synthesis). The properties of the pigments obtained were evaluated by composition analysis, structural analysis and measurement of the hue in the same way as defined in Example 1. The results are shown in Table 2 (Composition of Pigment Measured by Fluorescent X-ray Analysis ), Table 3 (Structure of Pigment as a Result of X-ray Diffraction) and Table 4 (Hue and Particle Diameter of Pigment).

The hues were evaluated on the basis of the Munsell color standard.

Comparative Example 1

300 ml of an alkaline suspension of pH 8.3 obtained by mixing 0.2 mol of $FeSO_4$, 0.2 mol of $TiCl_3$ and 0.55 mol of $Na_2CO_3$ was charged into an autoclave, and heated to 200° C. The suspension was held at 200° C. for 5 hours while mechanically agitating, thereby precipitating black particles.

After the precipitated particles were cooled to room temperature, they were filtered out, washed with water and dried by an ordinary method, thereby obtaining 33 g of black particles having an average particle diameter of 0.08 $\mu$m.

The results of the evaluation of the properties of the black particles are shown in Tables 2 to 4.

TABLE 1

(Condition for Synthesis)

Material particles and composition amount (g)

| | TiO$_2$ (Average particle diameter: 0.25 μm) | MgO (Average particle diameter: 0.10 μm) | Fe$_2$O$_3$ (Average particle diameter: 0.25 μm) | NiO (Average particle diameter: 0.12 μm) |
|---|---|---|---|---|
| Ex.2 | 400 | 40 | 320 | — |
| Ex.3 | 400 | 100 | — | 188 |
| Ex.4 | 400 | 40 | — | 300 |
| Ex.5 | 400 | 100 | — | — |
| Ex.6 | 400 | 40 | — | — |
| Ex.7 | 400 | — | — | 188 |
| Ex.8 | 400 | — | — | 300 |
| Ex.9 | 400 | — | 200 | 188 |
| Ex.10 | 400 | — | 320 | 75 |
| Ex.11 | 400 | — | 200 | — |
| Ex.12 | 400 | — | 320 | — |
| Ref. Ex.1 | 400 | 200 | — | — |
| Ref. Ex.2 | 400 | — | 400 | — |
| Ref. Ex.3 | 400 | — | — | 375 |
| Ref. Ex.4 | 400 | — | — | — |

Table 1 (continued)

| | Material particles and composition amount (g) CoO (Average particle diameter: 0.15 μm) | Calcining conditions Temperature (°C.) | Calcining conditions Time (min.) |
|---|---|---|---|
| Ex.2 | — | 1250 | 180 |
| Ex.3 | — | 1100 | 150 |
| Ex.4 | — | 1250 | 180 |
| Ex.5 | 188 | 1100 | 150 |
| Ex.6 | 300 | 1250 | 180 |
| Ex.7 | 188 | 1300 | 180 |
| Ex.8 | 75 | 1300 | 180 |
| Ex.9 | — | 1250 | 150 |
| Ex.10 | — | 1250 | 150 |
| Ex.11 | 188 | 1150 | 120 |
| Ex.12 | 75 | 1150 | 120 |
| Ref. Ex.1 | — | 1350 | 180 |
| Ref. Ex.2 | — | 1350 | 180 |
| Ref. Ex.3 | — | 1350 | 180 |
| Ref. Ex.4 | 375 | 1350 | 180 |

TABLE 2

(Composition of Pigment Measured by Fluorescent X-ray Analysis)

| | Heat Resistance (°C.) | M1+M2 Ti | Divalent metals (M1 and M2) and composition ratio (M1/M2) | | M1/M2 |
|---|---|---|---|---|---|
| | | | M1 | M2 | |
| Ex.2 | 650 | 1.0 | Mg | Fe | Mg/Fe = 20/80 |
| Ex.3 | 700 | 1.0 | Mg | Ni | Mg/Ni = 50/50 |
| Ex.4 | 730 | 1.0 | Mg | Ni | Mg/Ni = 20/80 |
| Ex.5 | 670 | 1.0 | Mg | Co | Mg/Co = 50/50 |
| Ex.6 | 710 | 1.0 | Mg | Co | Mg/Co = 20/80 |
| Ex.7 | 700 | 1.0 | Ni | Co | Ni/Co = 50/50 |
| Ex.8 | 730 | 1.0 | Ni | Co | Ni/Co = 80/20 |
| Ex.9 | 700 | 1.0 | Fe | Ni | Fe/Ni = 50/50 |
| Ex.10 | 650 | 1.0 | Fe | Ni | Fe/Ni = 80/20 |
| Ex.11 | 680 | 1.0 | Co | Fe | Co/Fe = 50/50 |
| Ex.12 | 650 | 1.0 | Co | Fe | Co/Fe = 20/80 |
| Ref. Ex. 1 | 700 | 1.0 | Mg | — | Mg = 100 |
| Ref. Ex.2 | 630 | 1.0 | Fe | — | Fe = 100 |
| Ref. Ex.3 | 700 | 1.0 | Ni | — | Ni = 100 |
| Ref. Ex.4 | 720 | 1.0 | Co | — | Co = 100 |
| Comp. Ex.1 (In the autoclave) | 300 | 1.0 | Fe | — | Fe = 100 |

TABLE 3

(Structure of Pigment as a Result of X-ray Diffraction)

| | Structure |
|---|---|
| Ex.2 | PSEUDOBROOKITE |
| Ex.3 | HEMATITE 93.8/XANTHIOSITE 6.2 |
| Ex.4 | HEMATITE |
| Ex.5 | GEIKIELITE 40.4/ECANDREWSITE 59.6 |
| Ex.6 | ECANDREWSITE |
| Ex.7 | ECANDREWSITE 68.1/GEIKIELITE 31.9 |
| Ex.8 | HIMATITE |
| Ex.9 | HIMATITE 40.7/KENNEDYITE 59.3 |
| Ex.10 | KENNEDYITE 53.5/RUTILE 46.5 |
| Ex.11 | ILMENITE 26/PSEUDOBROOKITE 74 |
| Ex.12 | PSEUDOBROOKITE |
| Ref. Ex.1 | GEIKIELITE |
| Ref. Ex.2 | PSEUDOBROOKITE 72.7/RUTILE 27.3 |
| Ref. Ex.3 | HEMATITE 89/RUTILE 11 |
| Ref. Ex.4 | ECANDREWSITE |
| Comp. Ex. 1 | ILMENITE |

TABLE 4

(Hue and Particle Diameter of Pigment)

| | Common name | Munsell color standard | Average particle diameter (μm) |
|---|---|---|---|
| Ex.2 | Gold | 5YR6/12 | 0.25 |
| Ex.3 | Limelight | 10Y9/4 | 0.20 |
| Ex.4 | Primrose yellow | 5Y8/13 | 0.30 |
| Ex.5 | Capri blue | 5B4/8 | 0.25 |
| Ex.6 | Bottle green | 10BG4/8 | 0.30 |
| Ex.7 | Malachite green | 7.5BG5/44 | 0.45 |
| Ex.8 | Chrome green | 10GY6/6 | 0.50 |
| Ex.9 | Coffee brown | 5YR3/3 | 0.43 |
| Ex.10 | Reddish brown | 10R5/10 | 0.40 |
| Ex.11 | Antique brown | 5YR2/1 | 0.35 |
| Ex.12 | Dark brown | 10R2/2 | 0.30 |

TABLE 4-continued (Hue and Particle Diameter of Pigment)

| | Common name | Munsell color standard | Average particle diameter ($\mu$m) |
|---|---|---|---|
| Ref. Ex.1 | White | N9 | 1.50 |
| Ref. Ex.2 | Dried grass color | 10R4/6 | 2.50 |
| Ref. Ex.3 | Canary | 7.5Y8/100 | 3.05 |
| Ref. Ex.4 | Viridian | 5BG3/6 | 3.00 |
| Comp. Ex. 1 | Black | N1 | 0.08 |

What is claimed is:

1. A heat-resistant inorganic pigment comprising a composite metal oxide consisting essentially of titanium, and a combination of a first divalent metal (M1) and a second divalent metal (M2), said composite metal oxide represented by the formula:

(M1+M2)TiO$_3$, and having an average particle diameter of about 0.05 to about 0.6 $\mu$m and a heat resistance of not less than 350° C., said first divalent metal (M1) and said second divalent metal (M2) being selected from the group consisting of Mg, Fe, Ni and Co, an atomic ratio of the sum of said first divalent metal (M1) and said second divalent metal (M2) to titanium being 0.95:1 to 1.05:1, and an atomic ratio of said first divalent metal (M1) to said second divalent metal (M2) being 95:5 to 5:95.

2. A heat-resistant inorganic pigment according to claim 1, wherein said atomic ratio of said first divalent metal (M1) and said second divalent metal (M2) to titanium is 1:1.

3. A heat-resistant inorganic pigment according to claim 1, wherein said atomic ratio of said first divalent metal (M1) to said second divalent metal (M2) is 85:15 to 15:85.

4. A heat-resistant inorganic pigment according to claim 1, wherein the heat resistance of the pigment is not less than 450° C.

5. A process for producing a heat-resistant inorganic pigment as defined in claim 1, which comprises the steps of:

mixing compounds of two divalent metals selected from the group consisting of Mg, Fe, Ni and Co with TiO$_2$;

heating and calcining the mixture at a temperature of not more than 1350° C.; and pulverizing the calcined product.

* * * * *